United States Patent Office 3,275,472
Patented Sept. 27, 1966

3,275,472
CONTINUOUS PROCESS FOR THE EXTRACTION OF SUGAR AND APPARATUS THEREFOR
Mohamed H. Tantawi, Abdel M. M. A. Rahman, and Saad F. Guindi, all of Cairo, United Arab Republic, assignors to Societe des Sucreries et de Distillerie d'Egypte, Cairo, United Arab Republic
Filed Apr. 21, 1964, Ser. No. 363,057
Claims priority, application United Arab Republic, Sept. 30, 1961, 1,200/61
7 Claims. (Cl. 127—5)

The present application is a continuation-in-part of copending application Serial No. 217,449, filed Aug. 16, 1962, now abandoned.

The invention relates to the extraction of sugar from cane, more particularly, with a process and an apparatus for the continuous extraction of sugar from sugar cane and/or sugar cane bagasse.

The term "bagasse" is used in this specification to mean mechanically degraded sugar cane either with or without partial extraction of the juices contained therein.

Sugar is produced commercially from sugar cane and sugar beet. Continuous processes for the extraction of sugar from sugar beet by diffusion are well known and have been successfully employed commercially for many years. However, it is only in recent years that an interest has been taken in providing a continuous, commercially applicable, process for the extraction of sugar from sugar cane by diffusion, although a batch process for the extraction of sugar from sugar cane by diffusion is known. The conventional method of extracting sugar juices from sugar cane is by the use of mills wherein the cane is crushed and its juices partly squeezed out leaving a form of bagasse from which a major portion of the juices have been extracted. These conventional methods do not generally make it possible to remove more than 60% of the moisture content of the sugar cane.

It is an object of the present invention to provide a continuous process for the extraction of sugar from sugar cane by means of diffusion principle as the main way of extraction.

Accordingly, the present invention provides a continuous counter-current diffusion process useful in the processing of sugar cane and/or sugar cane bagasse for the recovery of sugar.

According to the present invention, the continuous diffusion process includes the steps of passing the cane successively through known adjustable devices for cane preparation, e.g., one cane-cutter followed by one three-roller cane mill, adapted to produce crushed bagasse having a particle size as, e.g., as follows:

|  | Length of Particles in Centimeters | | | | |
|---|---|---|---|---|---|
|  | 10-15 | 6-8 | 3-5 | 2 | Fine |
| Total Percentage | 7% | 21% | 48% | 18% | 6% |

This bagasse is then conveyed to a feeding hopper which deposits a uniform amount of the bagasse on a horizontal conveyer which slowly carries the uniform bed of bagasse having a constant depth over a horizontal stationary perforated screen to which there is attached vertical sidewalls which limit both sides of the bed through the whole of the diffuser. This bed, which is moving in one direction, is repeatedly treated, in successive operations, with sugar solutions of progressively decreasing concentrations in the direction of movement of the bed ending with fresh water. Said sugar solutions are fed to the moving bed of bagasse from above by sprinklers or similar distributors, spaced over the longitudinal travel of the bagasse and extending above the bed over the whole width of the housing. Beneath the screen, there are arranged, side by side, collecting tanks to contain the solutions from each distributor which are percolated through the bed of bagasse and drained through the circular apertures of the screen, said tanks being arranged in such a way so as to provide a separate tank for each of the solutions coming from the several distributors without any of the solutions being mixed with the other solutions coming from the adjacent distributors and having different concentrations.

Counter-current flow is achieved by passing the solutions which have percolated through the bagasse to the next distributor in a direction opposite to the movement of the bed.

After a few passages through the bagasse, the original fresh water becomes more and more concentrated with sugar until it becomes almost saturated. This solution is hereinafter called "saturation juice." The saturation juice is then heated and percolated through fresh bagasse coming from the feeding hopper and then collected in a collecting tank. The so-obtained juice is hereinafter called "diffusion juice." The diffusion juice is then processed in a known manner per se to separate the sugar.

The exhausted bagasse is collected in an outlet hopper and then conveyed to devices for removing the water therefrom, as e.g., two successive mills. A mill is three expression rolls placed in series or tandems.

The water containing sugar which is obtained from the exhausted bagasse is filtered, heated, chemically treated and then 95% of the extracted water is recycled back into the diffuser so that it percolates through the moving bed of bagasse. This water, depending on conditions, has a certain pH and temperature, e.g., a temperature of 75° C. and a pH of from 8.5 to 9. This water is preferably fed onto the bagasse bed from the distributor (sweet water distributor) immediately preceding the distributor feeding the fresh water.

The distance between any two distributors is adjusted so that the solution conveyed to one distributor is drained from the bed of bagasse fed by the next distributor disposed in the direction of the movement of the bed of bagasse.

Sugar solutions resulting from the percolation of fresh, and sweet water, and flowing downwards through the perforations of the stationary screen are collected in one common tank disposed below the discharge end of the diffuser. From this tank, the collected sugar solution is conveyed to a further distributor or the like which is arranged at a suitable distance from the sweet water distributor in a direction opposite to the movement of the bed of bagasse.

This counter-current flow of the solution resulting from the percolation of fresh water and hot clarified sweet water through the moving bed of bagasse, which on each passage through the bagasse becomes more and more concentrated with extracted sugar, is repeated until a relatively concentrated juice (saturation juice) is obtained which is then conducted through heaters and sprayed on the fresh charged bagasse by a suitable distributor. The solution after percolation through fresh bagasse is called "diffusion juice" which is a very concentrated and pure solution of sugar. This solution can be withdrawn from the end tank disposed below the charging end of diffuser and the sugar separated therefrom.

If desired, this diffusion juice may be collected in one common tank with the "saturation juice" and the mixed juice is heated and recycled to the fresh bagasse whereupon the overflow from said common tank leaves the diffuser as diffusion juice, thus producing a very effective method of extracting or removing the sugar from cane bagasse. Said recycled hot juice which normally has the same concentration as the diffusion juice, is fed to the fresh bagasse in such a way that part of it is used to wet the bagasse in the charging chute and the remaining part is conducted to another distributor disposed at a suitable distance from the feeding end.

Among the objects of the present invention, is to provide a horizontal continuous diffuser particularly useful in carrying out the process. In particular, the apparatus of this invention embodies a stationary horizontal perforated screen to which is attached vertical side walls thereby limiting both sides of the moving bed of bagasse. On the surface of the stationary screen, there is one or more twin endless chains provided with metallic horizontal slates attached transversely to the faced lateral sides of each twin-chain. Beneath the stationary screen there are arranged side by side receiving tanks for the solutions draining from the moving bed of bagasse. Individual conveying pumps are connected directly to each tank and distribute the solution over the bed by distributing devices arranged in such a manner that the solution flows in a downward direction through the bed of bagasse and is collected independently in the preceding tank.

For example, fresh water at ambient temperature (25°–30° C.) is fed over the bed of bagasse by sprinklers or similar distributors arranged near the discharge end of the diffuser in such a way that the exhausted bagasse passed through a sufficient draining zone so that it is completely free of the percolating solution and leaves the diffuser with the minimum possible moisture content, e.g., a maximum range of from 78 to 81%. At a suitable distance preceding the fresh water distributor, in a direction opposite to the movement of the bed of bagasse in the diffuser, hot, clear, sweet water (e.g.) 75° C. and pH 9.0, is fed over the bed of bagasse by another distributor.

It is preferable to have the distances between the distributors arranged so that when any sugar solution is sprayed on the bagasse said solution has passed completely through the screen before reaching the next distribution point.

The distances of the distributors from each other are advantageously arranged in accordance with the mean percolation speed of the solution through the saturated bed of bagasse and the linear speed of the bagasse through the diffuser.

Suitably, the depth of the bagasse is such that with one or more passages through the bed the extracted content of sugar in the solution achieves a state of equilibrium, i.e., the solution leaving the bed has reached its maximum content in accordance with the sugar content to be extracted in the bagasse. In this way, particularly good extraction is achieved.

The receiving tanks into which the solutions are drained, are arranged in such a way as to provide a separate tank for each of the solutions coming from the several distributors.

This renders it impossible for the solution draining from the bagasse in the zone of one distributor to become mixed with the solutions coming from the adjacent distributors which have different concentrations.

The receiving tanks are disposed side by side beneath the stationary perforated screen. Each is provided with deeply inclined bottom arranged downwards towards the point where the tank is connected to the respective cycling pump through a pipe.

Each of the receiving tanks is connected directly to an individual shockless pump, of suitable capacity and having a low pressure head, so adapted that it is capable of pumping the particular sugar solution containing particles of fine bagasse, except that the saturation juice or diffusion juice conveyed to the heaters is pumped, after being carefully strained, by a centrifugal pump having a high pressure head and of suitable capacity.

In case one of the conveying pumps fails, each of the receiving tanks is provided with an overflow device arranged in such a manner that the solution collected may overflow, from one tank into the next, in a direction opposite to the movement of the bagasse.

The maximum quantity of liquid fed to the bagasse is adjusted so that the bagasse is not submerged in the liquid during passage through the diffuser. This can be achieved simply by feeding only so much of the liquid, evenly, over a defined fresh bed of bagasse, that a small portion of it just begins to flow over the upper surface of the stationary perforated screen, provided that no liquid flows over the top surface of the bed and that the perforations of the stationary screen are circular apertures. The diameter of the apertures at the charging end are about ½ to ¾ the size of the diameters at the discharge end, e.g., 8 mm. diameter at the charging end and 12 mm. at the discharge end. The area of the perforations in the screen should be about 15% to 40% of the total screen area.

The quantity of liquor, determined as above, is normally equal to the quantity of solution that can saturate the moving bed of bagasse plus the maximum quantity that can percolate through this bed and through the open areas of the perforated screen below.

The amount of liquid necessary to saturate the bagasse can be determined in the same manner. That is, the liquid is fed evenly and slowly over the bagasse so that a small portion of it begins to flow from the perforated screen provided that no liquid flows over the surface of the bed.

Based upon the above conditions, it was found that if about 55 kilograms of cane juice is extracted from 100 kilograms of cane, the quantity of sugar solution having a specific gravity of about 1.02 which is needed to saturate the prepared cane or bagasse is about 600 to 650 kilograms per ton of spent cane. The maximum percolation rate of said sugar solution through a bed of saturated bagasse having a depth of 170 centimeters is about 1500 to 1600 liters per minute over one square meter of the screening surface if it be assumed that the open area of the screen under the square meter is 100%. Generally when the perforations have a diameter of from 8 mm. to 12 mm., the percolation rate is about 900 liters per minute per square meter.

The fresh water which is sprayed on the bagasse is normally not heated.

Heating of the various solutions is done in only two stages of the process. The first is the heating of the turbid sweet water which comes from the exhausted bagasse during the mill operation wherein the temperature is adjusted for the subsequent clarification process. The second is the heating of the saturation juice or diffusion juice before feeding said juices onto the fresh bagasse, wherein the temperature is adjusted so as to maintain the temperature of the bagasse in its passage through the diffuser at not less than 65° C., preferably between 65° C. and 75° C., provided that the maximum time of the bagasse in the diffuser is not over 25 minutes.

The optimum conditions for the extraction are obtained when the temperature of the bagasse in the diffuser is maintained at a temperature that renders its tissues permeable so that the enclosed sugar solution acts in accordance with the general laws of diffusion and dissolution.

It has been found that the temperature of the bagasse is preferably maintained at or above 65° C. and for most purposes, within the range of 65° C. to 75° C., which sterilizes the sugar solutions and the bagasse.

The fresh bagasse added to the diffuser is advantageously and suitably moistened with the hot saturation juice, e.g., a temperature of from 90–95° C. This temperature has the advantage that clogging of the stationary screen by particles of the bagasse is avoided, and a better flow of the draining solution is secured.

The exhausted bagasse being discharged from the diffuser, after passing through a sufficient draining zone, leaves the diffuser and passes through a drying apparatus, known per se, which generally consists of two successive three-roller bagasse mills where the bagasse is partially dried so that the bagasse contains the least possible moisture content and the minimum possible loss of sugar. The bagasse is then further treated in a known matter, or used as such.

A particular high density and purity of a very concentrated sugar solution which is known as diffusion juice can be obtained when the draining sugar solutions sprayed on the bagasse have a pH ranging from 7.8 at the discharge end, to 6.0 at the charging end of the diffuser.

This pH can be obtained by regulating the pH of the clarified sweet water between 8.5 to 9.0. However, as indicated above, the diffusion juice purity also depends on the retention time of the bagasse in the diffuser, and, preferably, for a maximum efficiency of extraction and high purity, the time is between 20 to 25 minutes. This means that the maximum travel of the bagasse in the diffuser may, for example, by about 25 meters provided that its linear speed is between 1.0 to 1.3 mm./min.

The efficiency of the extraction also depends on the particle size and the specific volume of the bagasse, both of which depend on the efficiency of devices, known per se, for preparing the cane.

As previously described, the mean percolation speed of the sugar solution through a bed of saturated bagasse of the indicated particle size and having a depth of 170 cm., is about 8.4 cm./sec.

If the bagasse is conveyed through a fixed travelling path at a constant speed and diffusers of different capacities are of different widths, it is found that the area of the vertical section of the saturated bed of bagasse, is determined by the amount of spent cane fed into the diffuser. This is a multiple of how many tons of cane per hour is added and is about 2 square meters per ton of cane added in an hour.

If, for example, the tonnage of the spent cane which is added to a diffuser having a width of 240 centimeters is 200 tons per hour, then the depth of the saturated bed of bagasse is preferably about 170 cm. The width to depth ratio is preferably about 1.2–2.6:1.

When operating in the manner described above, the path travelled by the bed of bagasse through the diffuser may advantageously be made equal to the distance traversed by the twin endless chains between the charging end and the discharging end of the diffuser.

A method of calculating the relationship between the dimension of the apparatus and its capacity is illustrated by the following in which it is assumed that the extraction capacity is 200 tons of cane per hour.

Weight of bagasse fed to the diffuser=(B) tons of bagasse/ton of cane, e.g., about 400 tons of cane.
Length of the conveyer=axial distance between front and rear sprockets;
=(L) in meter, e.g., about 25,000.
Width of the conveyer=(W) in meter, e.g., about 2,400.
Height of saturated bagasse bed=(H) in meter, e.g., about 1,700.
Linear speed of conveyer=(S) in meter per minute, e.g., about 1.2 m./min.
Density of the fresh bagasse fed to diffuser=(D) in tons per cubic meter, e.g., about 0.220 ton/cu. m. having 56% moisture content.
Effective rate of percolation through a depth "H" of saturated bagasse bed per unit of time per unit of filtering surface of stationary screen=(R) cubic meters/minute/square meter of working filtering surface, e.g., about 0.900 cu. m./min./sq. m.;
=(X) provided that the total free area of perforations is not less than 25% of the total screen surface, and that the perforations are of circular apertures of diameter in the range of $8^n$./m. to $12^n$./m.
Total working filtering surface of stationary screen provided for each circulation=(F) in square meters, e.g., about 7.2 sq. m. (including the surface occupied by the attached supports of the endless chains).

Retention time of the bagasse in the diffuser=(N) in minutes, e.g., about 21 minutes.
Quantity of fresh water used=(A) in cubic meters per ton of cane, e.g., about 400 liters/ton cane based on a total of about 100 liters calculated on 1000 tons of spent cane.
Quantity of clarified sweet water extracted from the exhausted bagasse and conveyed to the diffuser at the respective distributor=(E) in cubic meters per ton of cane, e.g., about 750 liters/ton cane.
Quantity of the sugar solution necessary to saturate the fresh bagasse fed to the diffuser=(Q) in cubic meters per tons of cane, e.g., 650 liters/ton cane;
=provided that mean percolation speed of liquid through saturated bed of bagasse of 170 cm. depth is 8.5 cm./sec.

Taking into consideration that a given amount of sugar solution sprayed over the saturated bed of bagasse at a given point will drain completely, leaving the bagasse at its initial degree of saturation and that the draining solutions resulting from both the fresh water and the sweet water are further circulated together over the bed at a preceding position in counter-current direction to the movement of bed and then assuming:

The number of circulation including the saturation circulation=(Y) in circulations, e.g., 5 circulations.

Then:
The quantity of bagasse fed to the diffuser/hour=(CB) in tons of bagasse/hour.
The quantity of sugar solution sprayed over the bed of saturated bagasse through each circulation=quantity of sugar solution drained from the same saturated bed of bagasse from the adjacent circulation in the direction of movement of bed;
=$C(A+E)$ cubic meters per hour;
=$\dfrac{C(A+E)}{60}$ cubic meters per minute.

To ensure complete and efficient drainage of the sugar solution conducted to one distributor disposed at any circulation RF m.³/min. must be equal or greater than $$\dfrac{C(A+E)}{60} \text{ m.}^3/\text{min.}$$

which means F must be equal or greater than $$\dfrac{C(A+E)}{60R} \text{ m}^2.$$

Assuming that:
the mean speed of percolation of a sugar solution through a saturated bed of bagasse of a certain height, e.g., 1.7 m.=(P) m./min., e.g., 8.5 cm./sec.,
the travel speed of bed=speed of endless conveyer,
=(S) m./min., e.g., 1.2,
the width of bed=width of diffuser;
=(W) meter, e.g., 2.4.

Then:
The distance (X) between the position of each two distributors which are arranged for two adjacent circulations, theoretically=

$$\dfrac{C(A+E)}{60RW} + \dfrac{H \times S}{P}$$

meters.

It is more desirable, in practical use, that the distance is within the range of 1.3 to 1.5 of the theoretical amount (e.g.) about 3 meters. To make sure that all the sweet water and the fresh water are distributed independently over the bed at their respective positions, a distance somewhat greater than the practical distance, is adopted for each of the two preceding additions, e.g., within 4–5 meters.

Taking in consideration that $(A+E)$ in cubic meters per ton of cane represents the quantity of sugar solution circulated to flood the fresh charged bagasse at the feeding end of the diffuser, e.g., about 1150 liters/ton cane; and that (Q) in cubic meters per ton of cane is the quantity of sugar solution necessary to saturate the fresh bagasse fed into the diffuser, e.g., about 650 liters/ton cane; the quantity of sugar solution extracted from the diffuser for further processing (diffusion juice)=$(A+E-Q)$ m.³/ton of cane;
=$C(A+E-Q)$ m.³/hour.

Since (C) is constant with regard to the capacity of the diffuser and (E) is a constant due to the fact that the moisture contents of the exhausted bagasse discharged from the diffuser is constant, and (Q) is constant if the quality of the bagasse fed into the diffuser is constant and, therefore, also its degree of saturation.

The quantity of the sugar solution extracted from the diffuser is directly proportional to the quantity of fresh water added at the outlet side of the diffuser.

*Juice collecting tanks.*—The number of tanks=$Y+1$ tanks. Assuming a retention time in the tanks of 5 minutes, and that the quantity of sugar solution collected in each tank $=C(A+E)$ m.³/hour, and all the tanks have the same capacities, the useful capacity of each tank $$=\frac{C(A+E)\times 5}{60} m.^3 = \frac{C(A+E)}{12} m.^3$$

and the total capacity of each tank=1.20 the useful capacity.

The foregoing continuous diffusion process satisfies numerous requirements necessary for a satisfactory operation, such as a high rate of diffusion provided by a maximum prepared cane or bagasse area; relatively continuous contact of prepared cane or bagasse with juice or solution provided with as large a surface of contact as possible; effective diffusion because of difference in sugar contents between the juice and the bagasse; uniform particle size and specific volume of bagasse which is produced by less costly cane preparatory equipment comprising one cane-cutter followed by one three-roller cane mill; continuous countercurrent movement of bagasse and juice without the juices mixings; ability to vary and control properly, throughout the whole diffusion process, the temperature so as to have the cells walls of the prepared cane or bagasse in a physical state which allows the highest possible sugar diffusion; low heat consumption; high concentration and purity of the raw juice; uniform and maximum exhaustion of bagasse; utilization in the diffuser of about 95% of the total quantity of extracted sweet water in the dehydrating unit; minimum sugar loss in the spent bagasse corresponding to less than 0.4% based on the weight of cane; uniform and minimum saturation of water corresponding to 40% based on a flow of 100 liters of water per 100 kilograms of used cane; minimum mechanical power necessary to operate the diffusion plant (maximum 1 kwh. for 1 T.C.H. normal running); minimum time that both juice and prepared cane or bagasse remain in the diffusion process; systematical separation of juice and bagasse; the entire diffusion plant is aseptic provided that the temperature is between 65° C. and 75° C. which is the most appropriate sterilizing temperature for the sugar solutions and the bagasse; ability of the diffuser to use cane having undergone the normal preparation in any cane mill (1 cane cutter followed by a 3-roller cane mill); capability of the process to adopt itself to the variations in the fiber content of different types of canes and to variations in the preparation of canes; systematical storage of the juice of degressive concentration based on the movement of the bed of bagasse; high percolation speed of juice through the bed of bagasse corresponding to about 8.4 cm./sec. in a saturated bed having a depth of 170 cms.; a high effective percolation rate corresponding to about 900 liters/min./square meter of screening surface; continuous self-cleaning of the stationary screen disposed below the moving bed of bagasse; ideal extraction curve covering the whole vertical cut of the bed of bagasse; capability of the diffusion plant to adapt itself to the variations in running rates with more than 30% capacity provided that the different diffusers have different widths but the same length. Additionally, the present process provides that a relatively large volume of prepared cane or bagasse may be treated in a relatively small area thereby minimizing oxidation and other harmful chemical reactions. Finally, a relatively high extraction is obtained, viz., about 98% of the sugar initially found in the cane is recovered.

In order that the invention may be clearly understood and readily carried into effect, it will now be described even more fully with reference to the accompanying drawings in which.

Figure 1:
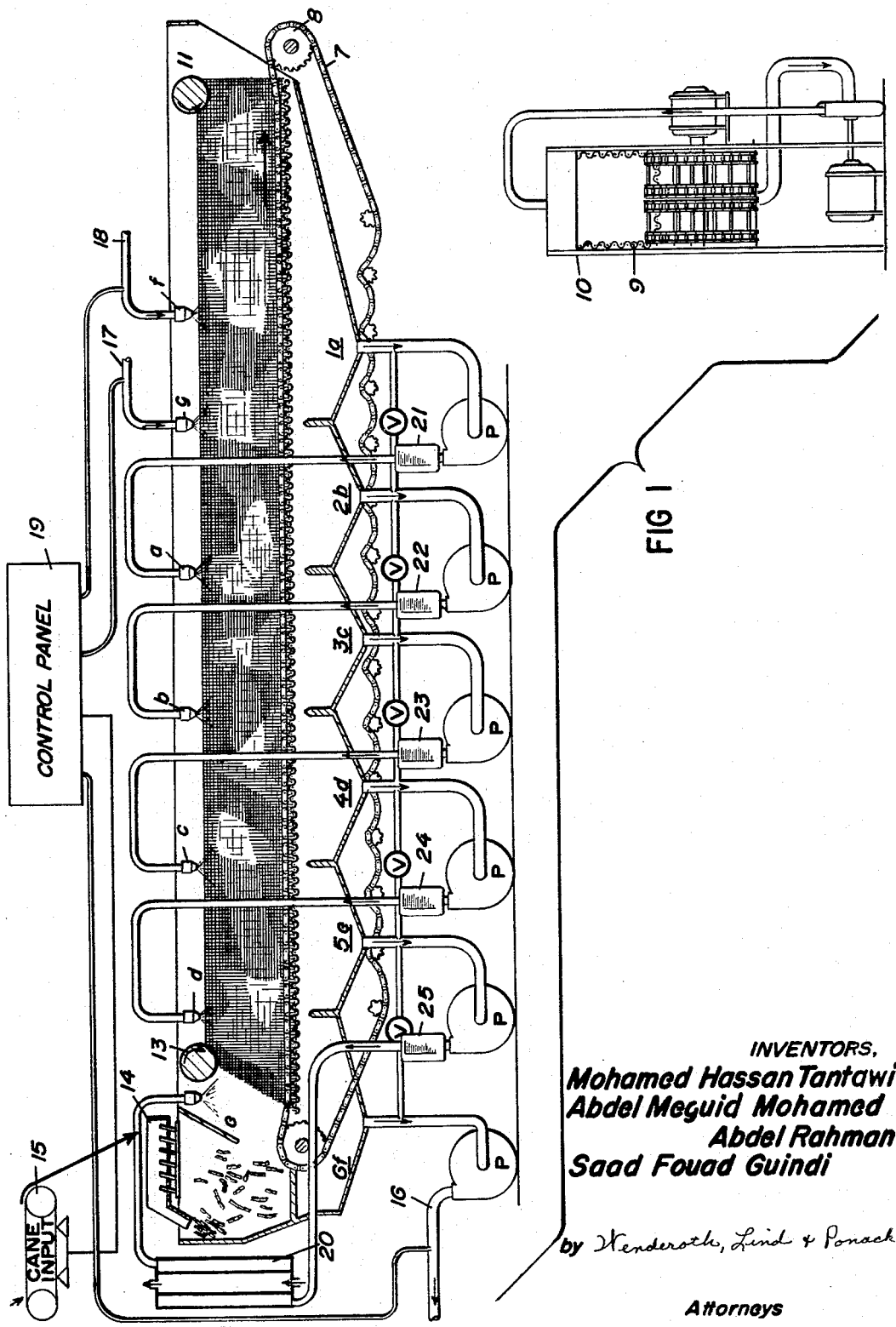
FIG. 1 is a side view partly sectional and partly schematic.
Figure 2:
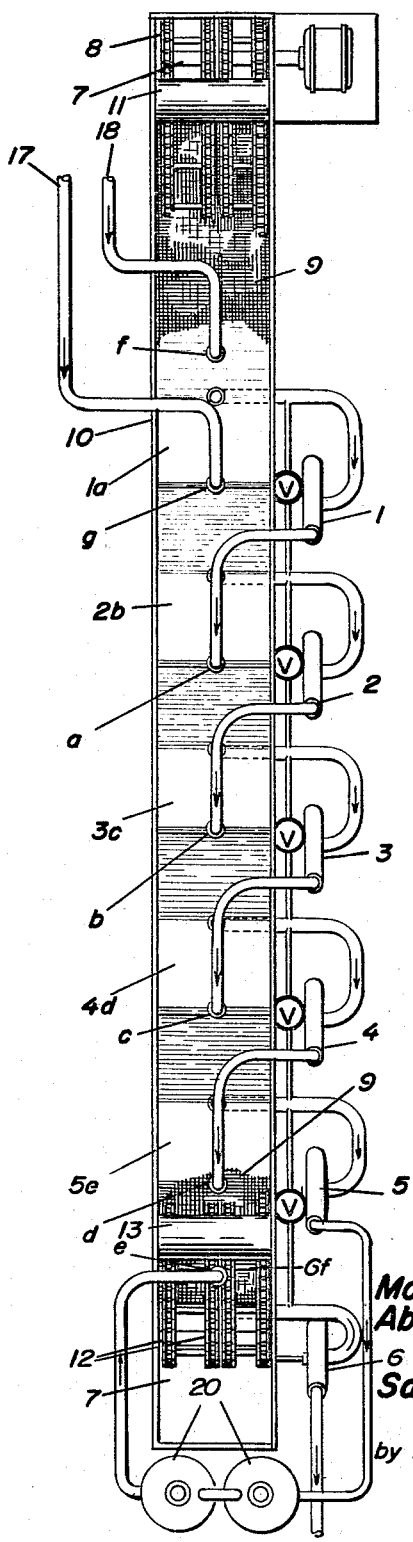
FIG. 2 is a plane top view of the apparatus in FIG. 1.

The prepared cane or bagasse is conveyed by conventional devices which are known per se, to a charging hopper from which it is continuously discharged into a weighing integrating belt scale, as for example, weighing band conveyer 15 which is provided with an electrical device which regulates the amount of cold water flowing through flowmeter 18. Said weighing band conveyer 15 is connected through the electrical device, to the central control panel 19 of the apparatus.

The weighing band conveyer 15 feeds the bagasse to a bagasse classifier 14 which classifies the bagasse as to particle size in such a manner that the larger bagasse rests on the surface of the stationary screen 9 in order to avoid blacking of the perforations of the screen.

The bagasse being classified is fed continuously into the diffuser where a charging chute made of specially shaped plate insures a homogeneous distribution of the classified bagasse on the whole width of the diffuser. The fresh classified bagasse being delivered to the diffuser is sprayed with a relatively concentrated juice (saturation juice) after being heated to a temperature that renders the tissues of the bagasse permeable. Saturation juice may be taken from receiving tank 5e suitably strained, pumped by circulation pump 5 to saturation juice heaters 20, then conducted to distributor e. The solution from distributor e, after percolating through the bagasse, the more highly concentrated sugar solution (diffusion juice) which is collected in receiving tank 6f and pumped by pump 6 to be further treated in a known manner.

Saturation juice and diffusion juice pumps 5 and 6 respectively, are centrifugal pumps equipped with fixed screen pots at their suction sides and with flowmeters to control delivery through the central control panel 19 of the diffuser apparatus. These pumps have sufficient capacity to deliver their respective sugar solutions and have a manometric head sufficient to overcome the friction losses at their delivery side. The casing and moving parts of the pumps are made from a material capable of withstanding the effects of acids and corrosion.

Figure 3:
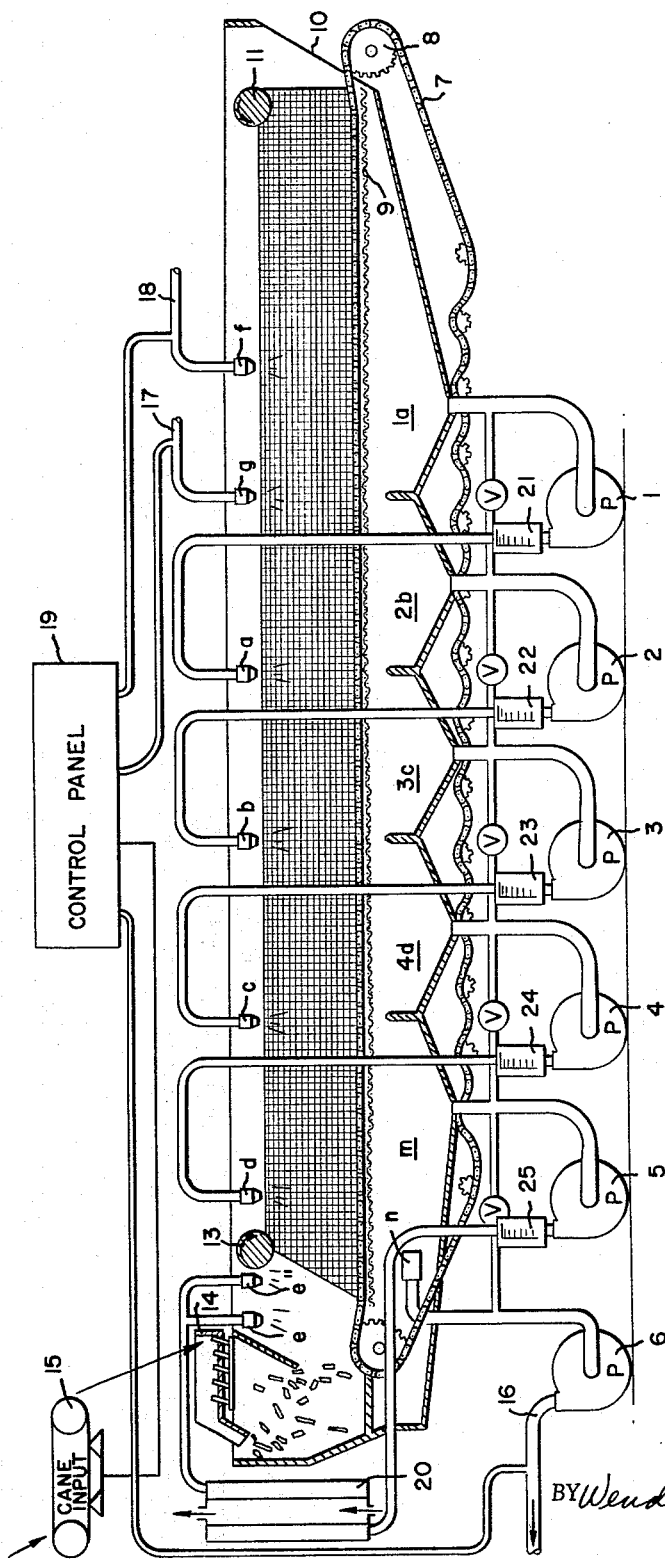
FIG. 3 is a side view in which the first and second extraction zones have a common collection zone.

The draining juice may be collected in one common tank with the draining saturation juice as shown in FIGURE 3. In this figure, the juice draining from the first extraction zone is mixed with the juice draining from the second extraction zone in one common collection zone m. The mixed solution is recycled by pump 5 through recycling heater 20 to flood the fresh charged bagasse by distributors e and e'' so that the recycled juice repeatedly comes into contact with fresh incoming bagasse and the drainage solution is again collected in the same collection zone m, whereupon the excess juice is drawn off continuously from said common collection zone through overflow box n and pumped with pump 6 through line 16 to a further sugar separating operation. The hot recycled juice is conducted to the fresh charged bagasse in such a way that part of it is used to wet the bagasse on the charging chute by distributor e, and the remaining part is conducted to another distributor e'' to completely flood the charged bagasse.

There is arranged in the diffuser two twin endless chains forming an endless conveyer 7 which are directly above the stationary horizontal screen 9 and travel side by side with the same linear speed over said screen. The horizontal stationary screen 9 is of metallic perforated sheets. There is attached to the longitudinal sides of the screen, vertical side walls 10 of welded steel sheets. The screen and the side walls are mounted together inside a frame of steel construction which forms the housing of the diffuser.

The four endless chains 7 are supported and guided at the same time by four parallel metallic angle sections fixed to the surface of the screen.

Each twin endless chain is provided with metallic horizontal slates attached transversally to the faced lateral sides of the chains.

The four travelling endless chains forming the two twin endless chains are supported at the ends by sprockets 8–12 which are mounted on common shaft. At the one end a constant speed motor drives the shaft by means of a variable speed reducer which permits the bed of bagasse to be conveyed through the diffuser on the surface of the stationary screen with a speed adjustable from 1.0 at 1.5 meters/min. Cylindrical drums turning freely on independent shafts are arranged to carry the return chains beneath the receiving tanks 1a, 2b, 3c, 4d, 5e, 6f.

The return chains are exposed underneath the housing of the diffuser where the return chains and slates are cleaned.

The screen is self-cleaning because of the moving bed of bagasse thereon.

The bagasse is fed from the charging chute into the diffuser and is deposited on the surface of the stationary screen 9 on which it is conveyed slowly, as an even bed of bagasse, by the travelling endless chains 7 and is continuously discharged from the diffuser in front of the sprockets 8. The exhausted bagasse being discharged is further conveyed to pass through an adjustable dewatering unit which may be, for example, two successive 3-roller bagasse mills.

A bagasse height limiting device 13, in the form of a rotating drum, and having a length equal to the width of the conveyer is arranged horizontally and rotates in the opposite direction of the conveyer at a speed adapted to the linear speed of the conveyer. This device can be moved upwards or downwards according to the working capacity of the conveyer and is driven by a variable speed geared motor.

A bagasse discharging device 11, which is similar to the height limiting device 13, with the exception that it rotates in the same direction as the conveyer and is arranged at a position in tank 10 which enables the device to regulate the discharge of bagasse.

Beneath the stationary screen and mounted on the same supporting steel frame, there is arranged, side by side, receiving tanks 1a, 2b, 3c, 4d, 5e, 6f for the draining sugar solutions which were sprayed on the bagasse by distributors a, b, c, d, e, f, g. Each of the said receiving tanks is provided with a bottom deeply inclined downward. At the bottom, there is a pipe through which the respective conducting solution passes to the circulating pump.

The juice collected in each of the above mentioned tanks is separately distributed by individual circulation pumps 1, 2, 3, 4 and 5 to respective juice distributing devices a, b, c, d, e. The casing and moving parts of the pumps are made from a material resistant to acids and corrosion in general. The pumps can handle a mixture of juice and bagasse. Each pump is equipped with a flowmeter 21, 22, 23, 24, which controls the delivery of the pumps through a central control panel 19 of the apparatus. The juice distributing devices a, b, c, d, e, f, g, are installed at a distance above the conveyer which permits a homogeneous distribution of the sugar solution onto the whole width of the bed of bagasse.

The amount of fresh water supplied to the diffuser through distributor f is automatically controlled by an adjustable flowmeter 18 which is functionally associated with the weighing band conveyer 15 in such a manner that a predetermined quantity of fresh water, based on the weight of bagasse, is fed to the diffuser.

Hot clarified sweet water is supplied to the diffuser through distributor g. Flowmeter 17 gives a permanent reading of the amount of said water conveyed to distributor g.

In the same manner as the sweet water, the quantity of diffusion juice which is produced is indicated permanently by flowmeter 16.

The central control panel 19 includes equipment for measuring and controlling the quantities of bagasse, water and different sugar solutions entering the diffuser and extracted therefrom. It also includes means for controlling the density of the diffusion juice extracted from the diffuser. The panel additionally includes measuring and control equipment for adjusting the temperature and pH value of the sugar solutions.

The apparatus described above is used as described infra.

The juice collecting tanks, with the exception of tank 6f which contains the diffusion juice and which remains isolated, are filled with water and are inter-connected. The conveyer 7, bagasse classifier 14, scale 15, bagasse height limiting device 13 and bagasse discharging device 11 are put in operation. The conveyer is fed with bagasse through the scale 15. Pump 5 is put into operation, receiving water from tank 5e and sending it through heaters 20 which raises the temperature of the water to the appropriate degree, and delivers the water to the distributing device e at the inlet of the conveyer which sprays and saturates the incoming bagasse with said water.

The juice collected in tank 6f is known as "diffusion juice" and is delivered by pump 6 to the next industrial operation where the sugar is separated.

Pump 4 is brought into operation when the bagasse reaches distributor d, at which point the extraction begins. Then pumps 3, 2 and 1 are successively put into operation when the bagasse reaches distributors c, b and a, respectively. The sweet water distributor g remains inoperative until the sweet water, extracted from the exhausted bagasse, arrives at the diffuser. The fresh water distributor e is put into operation to supply the needs of the diffuser until the arrival of the sweet water at distributor g. When the sweet water arrives at its distributor, all tanks are isolated and the quantity of fresh water added is regulated to compensate for the amount of diffusion juice extracted from tank 6f, which is about 95% or more of the total solution in the tank.

Once the tanks are isolated from each other the operation of the diffuser proceeds as follows. Sugar solution resulting from percolation of sweet water and fresh water through the bagasse is collected in tank 1a. Sugar solution collected in this tank 1a is delivered by pump 1 to distributor a. Sugar solution collected in tank 2b is delivered by pump 2 to distributor b. Sugar solution collected in tank 3c is delivered by pump 3 to distributor c. Sugar solution collected in tank 4d is delivered by pump 4 to distributor d. The saturation juice collected in tank 5e is delivered by pump 5 through heaters 20 to distributor e. The diffusion juice collected in tank 6f is delivered by pump 6 to the next industrial process, wherein sugar is separated.

Having thus disclosed the invention, what is claimed is:

1. A continuous, counter-current, diffusion method for the extraction of sugar from sugar cane and bagasse, which comprises horizontally moving a bed of cut sugar cane having a temperature of at least 65° C., thereby rendering the tissue of the sugar cane permeable, and a uniform depth and width successively through a plurality of independent extraction zones wherein the top surface of said bed of sugar cane, in each extraction zone, is contacted with a solution of sugar and water whereby said solution percolates through said bed of sugar cane, the solution, in each extraction zone, containing less sugar than the solution in the preceding extraction zone, the solution in any extraction zone subsequent to the first two extraction zones being percolated through the bed of sugar cane before said sugar cane enters the next extraction zone, collecting the solutions drained from said extraction zones in collection zones positioned below said extraction zones so that the drained solution from any extraction zone subsequent to the first two extraction zones does not mix with the drained solution from any other extraction zone, recycling the solutions contained in the collection zones located after the first collection zone, to the preceding extraction zone and contacting the surface of the bed of sugar cane located in said extraction zone with said solution, the first and second extraction zones having a common collection zone, the drained solution contained in said common collection zone being heated to a temperature of at least 65° C. and then percolated through the fresh incoming sugar cane, the overflow of solution in said common collection zone being conducted to a sugar separating apparatus whereby the sugar is separated from said solution, extracting the sugar water from the bed of sugar cane leaving the last extraction zone, heating to a temperature of at least 65° C. and recycling said sugar water to the last extraction zone and contacting said sugar water, together with fresh water, with the bed of sugar cane located in the last extraction zone.

2. A process according to claim 1 wherein the pH of the sugar solution delivered to the surface of the sugar cane is between 6.0 and 9.0 and is progressively decreased towards the feeding end of the extraction zone.

3. A process according to claim 1 wherein the retention time of the cane through extraction zone is between 20 and 25 minutes.

4. A process according to claim 1 wherein the quantity of the sugar solution which is delivered to the bed of sugar cane is such that no solution flows over the surface of the sugar cane and the sugar solution is percolated at a continuous rate through the whole vertical section of the sugar cane.

5. A process as defined in claim 1 wherein the sugar cane has the following particle size:

| | Length of Particles in Centimeters | | | | |
|---|---|---|---|---|---|
| | 10-15 | 6-8 | 3-5 | 2 | Fine |
| Total Percentage | 7% | 21% | 48% | 18% | 6% |

6. An apparatus for the extraction of sugar and bagasse from sugar cane for use in carrying out the diffusion by counter-current diffusion, which comprises a metallic elongated horizontal trough having two metallic vertical longitudinal side walls to which a fixed metallic horizontal perforated bottom is attached at the lower edges, said trough being supported on a fixed supporting steel structure, means for delivering the sugar cane to the charging end of the trough, at least one pair of twin endless travelling chains moving horizontally side by side at the same speed on the surface of the horizontal stationary perforated screen, entraining slowly an even bed of sugar cane and its bagasse, said twin endless chains having spaced metallic horizontal slats attached to the lateral sides of the chains transversally to its travel, a plurality of distributors arranged over the said bed of sugar cane and being so spaced that sugar solutions which are distributed therefrom are sprayed on said travelling bed, metallic receiving tanks beneath the perforated screen, side by side, for receiving the solutions draining from the bed of sugar cane and bagasse, said tanks being piped independently to circulating pumps allowing each of the draining sugar solutions to be conducted to the respective distributor, said tanks together with the metallic trough forming one horizontal continuous section being supported on the fixed supporting steel structure.

7. An apparatus as claimed in claim 6 wherein the diameter of the perforations at the front end of the perforated bottom are about ½ to ¾ the size of the diameter of the perforations in the lower end, the area of the perforations in the bottom being about 15 to 40% of the total area.

References Cited by the Examiner
FOREIGN PATENTS
565,928 4/1958 Belgium.
424,978 2/1911 France.
851,176 10/1952 Germany.
813,394 5/1959 Great Britain.

OTHER REFERENCES
McGinnis: Beet-Sugar Technology, 1951, Reinhold Publishing Corp., New York, N.Y., p. 167 relied on.

Wilcox, Next: Sugar Cane Diffusion, Sugar, May 1951, pp. 28-30.

MORRIS O. WOLK, *Primary Examiner.*

M. E. ROGERS, *Assistant Examiner.*